(12) United States Patent
Sekine et al.

(10) Patent No.: US 11,186,059 B2
(45) Date of Patent: Nov. 30, 2021

(54) HONEYCOMB SANDWICH STRUCTURE AND METHOD FOR MANUFACTURING THE SAME

(71) Applicant: Mitsubishi Electric Corporation, Tokyo (JP)

(72) Inventors: Kazushi Sekine, Tokyo (JP); Masahiro Miyashita, Tokyo (JP); Hiroki Kobayashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 127 days.

(21) Appl. No.: 16/495,628

(22) PCT Filed: Apr. 14, 2017

(86) PCT No.: PCT/JP2017/015229
§ 371 (c)(1),
(2) Date: Sep. 19, 2019

(87) PCT Pub. No.: WO2018/189876
PCT Pub. Date: Oct. 18, 2018

(65) Prior Publication Data
US 2020/0023606 A1 Jan. 23, 2020

(51) Int. Cl.
*B32B 3/12* (2006.01)
*B32B 5/02* (2006.01)
*B32B 27/12* (2006.01)

(52) U.S. Cl.
CPC ............... *B32B 3/12* (2013.01); *B32B 5/024* (2013.01); *B32B 27/12* (2013.01)

(58) Field of Classification Search
None
See application file for complete search history.

(56) References Cited

U.S. PATENT DOCUMENTS

| 2009/0252863 A1 | 10/2009 | Yoshizawa |
| 2013/0011603 A1 | 1/2013 | Yasukochi |

(Continued)

FOREIGN PATENT DOCUMENTS

| JP | S64-063136 A | 3/1989 |
| JP | H04-053733 A | 2/1992 |

(Continued)

OTHER PUBLICATIONS

International Search Report of the International Searching Authority dated Jul. 18, 2017 for the corresponding international application No. PCT/JP2017/015229 (and English translation).

(Continued)

*Primary Examiner* — David Sample
*Assistant Examiner* — Elizabeth Collister
(74) *Attorney, Agent, or Firm* — Posz Law Group, PLC

(57) ABSTRACT

A honeycomb sandwich structure in which moisture absorption deformation can be sufficiently suppressed and a method for manufacturing the same are provided. The honeycomb sandwich structure includes: a honeycomb core having a recess in a mesh of a carbon fiber fabric; a pair of face plates; a resin layer which fills a part of the recesses; and a water-impermeable film which covers an exposed area including surfaces of the resin layer and the honeycomb core, wherein the recess includes an unfilled part, the unfilled part is a part of the recess that is closer to the opening of the recess, and the unfilled part is not filled with the resin layer.

20 Claims, 17 Drawing Sheets

(56) References Cited

U.S. PATENT DOCUMENTS

| | | |
|---|---|---|
| 2015/0266260 A1 | 9/2015 | Fujioka et al. |
| 2015/0290920 A1 | 10/2015 | Braden et al. |
| 2016/0009876 A1* | 1/2016 | Rodriguez ........... C09D 165/04 428/339 |
| 2018/0117802 A1 | 5/2018 | Sekine et al. |

FOREIGN PATENT DOCUMENTS

| | | |
|---|---|---|
| JP | H05-080212 A | 4/1993 |
| JP | 2003-343570 A | 12/2003 |
| JP | 2008-068437 A | 3/2008 |
| JP | 2012-001013 A | 1/2012 |

OTHER PUBLICATIONS

Office Action dated Apr. 3, 2018 issued in corresponding JP patent application No. 2017-551730 (and English translation).

Toshiyuki Kawai et al., "Prevention of water absorption for CFRP laminates by surface modification." The composite Abstracts of Materials Symposium, 2006, vol. 31, p. 133-134. (cited in the JP Office Action).

Arao Azuka Fumihiko. "Study on long-term dimensional stability of light weight and high precision CFRP mirror." Waseda Doctoral dissertation, Graduate School of Science and Technology, Feb. 2010, p. 166-167. (cited in the JP Office Action).

Toshiyuki Kawai et al., "Prevention of water absorption for CFRP laminates by surface modification." The composite Abstracts of Materials Symposium, 2006, vol. 31, p. 133-134. (and English machine translation).

Arao Azuka Fumihiko. "Study on long-term dimensional stability of light weight and high precision CFRP mirror." Waseda Doctoral dissertation, Graduate School of Science and Technology, Feb. 2010, p. 166-167. (and English machine translation).

Extended European Search Report dated Mar. 2, 2020 issued in corresponding EP patent application No. 17905169.3.

\* cited by examiner

HONEYCOMB SANDWICH STRUCTURE AND METHOD FOR MANUFACTURING THE SAME

CROSS REFERENCE TO RELATED APPLICATIONS

This application is a U.S. national stage application of International Application No. PCT/JP2017/015229, filed on Apr. 14, 2017.

TECHNICAL FIELD

The present invention relates to a honeycomb sandwich structure which includes a honeycomb, and a method for manufacturing the same.

BACKGROUND

As demand for high-resolution satellite images has been escalating in recent years, it is required to develop an observation satellite equipped with a telescope having a resolution higher than conventional ones. To improve the resolution of a telescope in such a satellite, a large mirror has to be installed. This requires a telescope structure that can support the large mirror. Because there is a weight limit for the entire observation satellite, the telescope structure is required to be light. Furthermore, the telescope structure is required to have high rigidity and high strength in order to support the large mirror even at launching. The telescope structure is also required to have a structure that produces little moisture absorption deformation on the earth. This is because when the telescope structure having absorbed moisture on the earth is launched, the telescope structure releases the absorbed moisture in the outer space, which causes the telescope structure to deform. The telescope structure deformation degrades the quality of images taken by the observation satellite.

A structure example that is lightweight and has a high-rigidity, is a honeycomb sandwich structure (for example, refer to Patent Document 1: Japanese Laid-Open Patent Publication No. 2008-68437), which includes a honeycomb core with two face plates adhered to both end faces of the honeycomb core. In order to use a honeycomb sandwich structure for the telescope structure, it is necessary to further enhance its strength and rigidity. Thus, as for a material for the face plates and the honeycomb core composing the honeycomb sandwich structure, carbon fiber reinforced plastic (CFRP) is preferable to a carbon fiber-reinforced carbon composite material mentioned in Document 1.

Regarding a technique to suppress moisture absorption deformation of the CFRP, there is a technique (for example, refer to Patent Document 2: Japanese Laid-Open Patent Publication No. H4-53733) for reducing the moisture absorption coefficient by adjusting fiber content ratio of the CFRP and the fiber direction thereof.

A typical method for preventing a component's surface from absorbing moisture is, for example, to form a water-impermeable film such as a diamond-like carbon (DLC) film on the component's surface.

In Patent Document 2, the moisture absorption coefficient can be reduced; however, moisture is absorbed from the surface of the CFRP, so that the moisture absorption deformation cannot sufficiently be suppressed. With respect to a technique to form the water-impermeable film such as a DLC film on the component's surface, problems to be caused when the technique is applied to the CFRP have not been considered.

SUMMARY

The present invention is devised in view of the problems described above and is aimed at obtaining a honeycomb sandwich structure capable of sufficiently suppressing the moisture absorption deformation and a method for manufacturing the same.

A honeycomb sandwich structure according to this disclosure includes: a honeycomb core which includes a first carbon fiber fabric woven in two or more mutually different fiber directions, the honeycomb core having a first recess at a mesh of the first carbon fiber fabric; a pair of face plates each of which includes a second carbon fiber fabric woven in two or more mutually different fiber directions, the face plates being adhered to the honeycomb core in such a way that the honeycomb core is sandwiched therebetween; a first resin layer which fills a part of the first recess; and a first water-impermeable film which covers an exposed area including surfaces of the first resin layer and the honeycomb core, wherein the first recess includes a first unfilled part, the first unfilled part being a part of the first recess that is closer to the first recess's opening than the first resin layer, the first unfilled part being not filled with the first resin layer.

A method for manufacturing a honeycomb sandwich structure according to any one of claims 1 through 6 includes: a first step of filling a part of the first recess of the honeycomb core with the first resin layer; a second step of forming the first water-impermeable film to cover the exposed area including surfaces of the first resin layer and the honeycomb core; and a third step of adhering the pair of face plates to the honeycomb core by heating under pressure.

The honeycomb sandwich structure and the method for manufacturing the same according to this disclosure can effectively suppress the moisture absorption deformation.

EMBODIMENTS

Hereinafter, a honeycomb sandwich structure and a method for manufacturing the same according to this disclosure will be described using FIG. 1 to FIG. 22. In the description of each figure, the same or equivalent components are given the same symbols to omit duplicate explanations. The honeycomb sandwich structure according to this disclosure is to be used, for example, in the field of aerospace.

Embodiment 1

Figure 1:
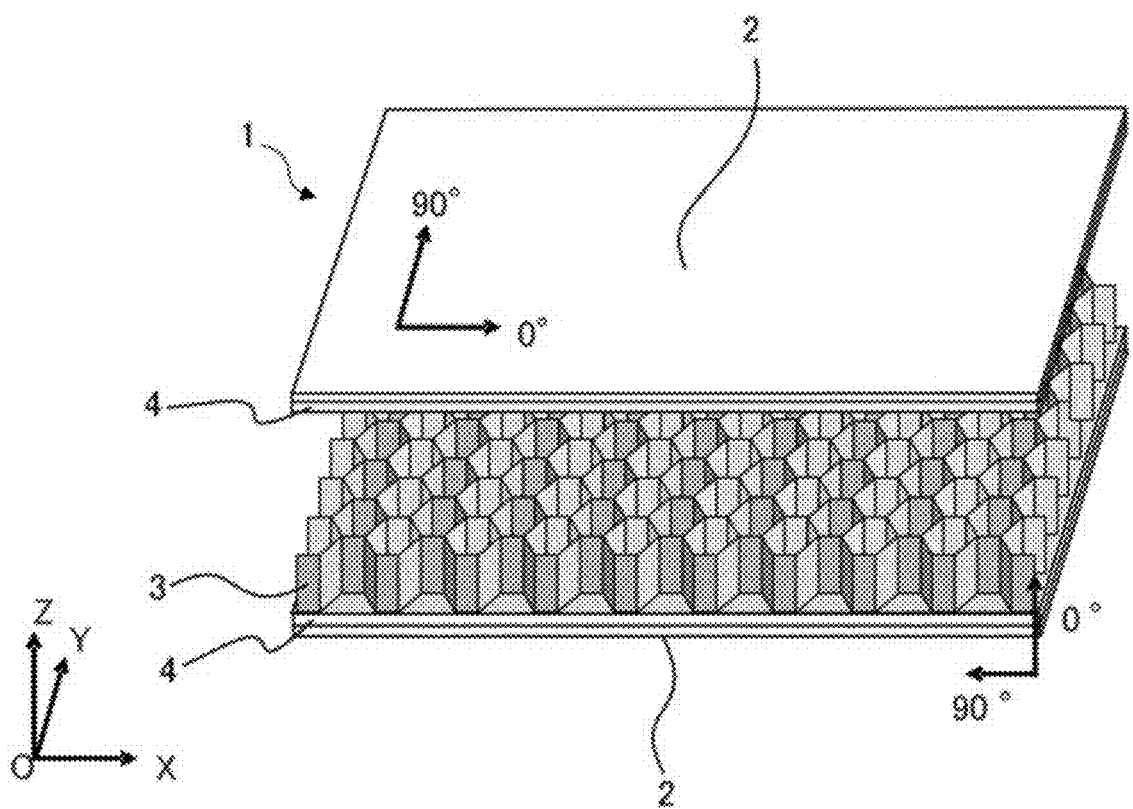
FIG. 1 is a perspective view showing the structure of a honeycomb sandwich structure according to Embodiment 1.

FIG. 1 is a perspective view showing the structure of a honeycomb sandwich structure according to Embodiment 1. The honeycomb sandwich structure 1 includes a honeycomb core 3 and a pair of face plates 2 adhered separately to a higher end face and a lower end face of a honeycomb core 3 shown in FIG. 1. The material for the face plates 2 and the honeycomb core 3 is a carbon fiber reinforced plastic (CFRP) containing carbon fiber fabric woven in two or more different fiber directions. The honeycomb core 3 is a structure composed of the same hexagonal prisms (cells) arranged without gaps.

In the following description, the out-of-plane direction of the honeycomb sandwich structure 1 is defined as the Z-axis direction. The X-axis direction and the Y-axis direction are orthogonal to each other, and the Z-axis direction is orthogonal to the X-axis direction and the Y-axis direction. In order to indicate the fiber direction of the carbon fibers contained in each of the face plate 2 and the honeycomb core 3, it is defined that in the face plate 2, the zero-degree direction is the X-axis direction and the ninety-degree direction is the Y-axis direction; and in the honeycomb core 3, the zero-degree direction is the Z-axis direction and the ninety-degree direction is the −X-axis direction. The ribbon direction of the honeycomb core 3 corresponds to the X-axis direction; the cell width direction of the honeycomb core 3 corresponds to the Y-axis direction.

A thermosetting adhesive sheet 4 is laid on a surface of each of the paired face plates 2; and the honeycomb core 3 is placed on the surface of one of the paired face plates 2, on which the thermosetting adhesive sheet 4 has been laid. Then, the other of the paired face plates 2 with the adhesive sheets 4 laid thereon is placed to cover the honeycomb core 3. After that, a heating process is performed under pressure to cure the adhesive sheets 4, to thereby manufacture a honeycomb sandwich structure 1. In short, the pair of face plates 2 are adhered to the honeycomb core 3, so that the honeycomb core 3 is sandwiched therebetween. In the present embodiment, the face plates 2 and the honeycomb core 3 are provided with a water-impermeable film and a resin layer to prevent moisture absorption deformation, and this will be described in detail later.

Here, an example of a method for manufacturing the face plates 2 of the honeycomb sandwich structure 1 will be described. First, plural bundles of highly elastic carbon fibers such as M60J (made by Toray Industries, Inc.) are arranged in two fiber directions. Then, the carbon fibers bundles are woven so that one fiber direction will become, for example, orthogonal to the other fiber direction, whereby a carbon fiber fabric 5a (illustrated in FIG. 4) having two fiber directions is produced. After that, the carbon fiber fabric is impregnated with a cyanate resin, EX1515 (made by TenCate Advanced Composites Holding B.V.), to produce a prepreg sheet for the face plate. A plurality of prepreg sheets for the face plate is piled up to produce a stack product of the prepreg sheets for the face plate. Then, the stack product of the face-plate prepreg sheets is heated at, for example, 120 degrees C. to 180 degrees C. under pressurized environment, for example, at a pressure of about 3 atmospheres. By the heating, the resin contained in the stack product of the face-plate prepreg sheets is cured, whereby the face plate 2 is produced.

An example of the method for producing the stack product of the face-plate prepreg sheets will be described. It is preferable that the characteristics of the face plate 2 such as thermal expansion coefficients and tensile elastic modulus are almost the same (pseudo isotropic) in all directions parallel to the surface of the face plate. In order that the face plate 2 has pseudo-isotropy, a plurality of the face-plate prepreg sheets is stacked with their arrangement directions varied. To be more specific, one of the fiber directions of the prepreg sheet to be placed first is regarded as the reference having 0 degrees, and then, six prepreg sheets are stacked in order at 0 degrees, 60 degrees, −60 degrees, −60 degrees, 60 degrees, and 0 degrees. Alternatively, eight prepreg sheets may be stacked in order at 0 degrees, 45 degrees, −45 degrees, 90 degrees, 90 degrees, −45 degrees, 45 degrees, and 0 degrees. A face plate 2 made with CFRP which is produced by curing the stack product produced by stacking the face-plate prepreg sheets, has the above-mentioned pseudo-isotropy. In addition, the number of the stacked face-plate prepreg sheets and the method for stacking the prepreg sheets for the face plate are not limited to the examples described above.

In a case where the cyanate resin EX1515 impregnated into the aggregation of the highly elastic carbon fibers M60J forming the face plate 2 serves as an adhesive, the honeycomb sandwich structure 1 may be produced, without using the adhesive sheets 4, by a process in which one of the pair of face plates 2, the honeycomb core 3, and the other of the pair of face plates 2 are stacked in order, and then heated under pressure. Also, the material of the face plate 2 is not limited to the prepreg sheet made of the carbon fiber fabric having two fiber directions described above. That is, the carbon fiber fabric may be a fabric in which the angle formed by its two fiber directions is other than 90 degrees. Further, a carbon fiber fabric having three fiber directions may be used. In this case, it is preferable that in the prepreg sheet, each of the angles formed by the three fiber directions be 60 degrees. Furthermore, it is needless to say that a prepreg sheet made of a carbon fiber fabric having three or more fiber directions may be used.

Figure 2:
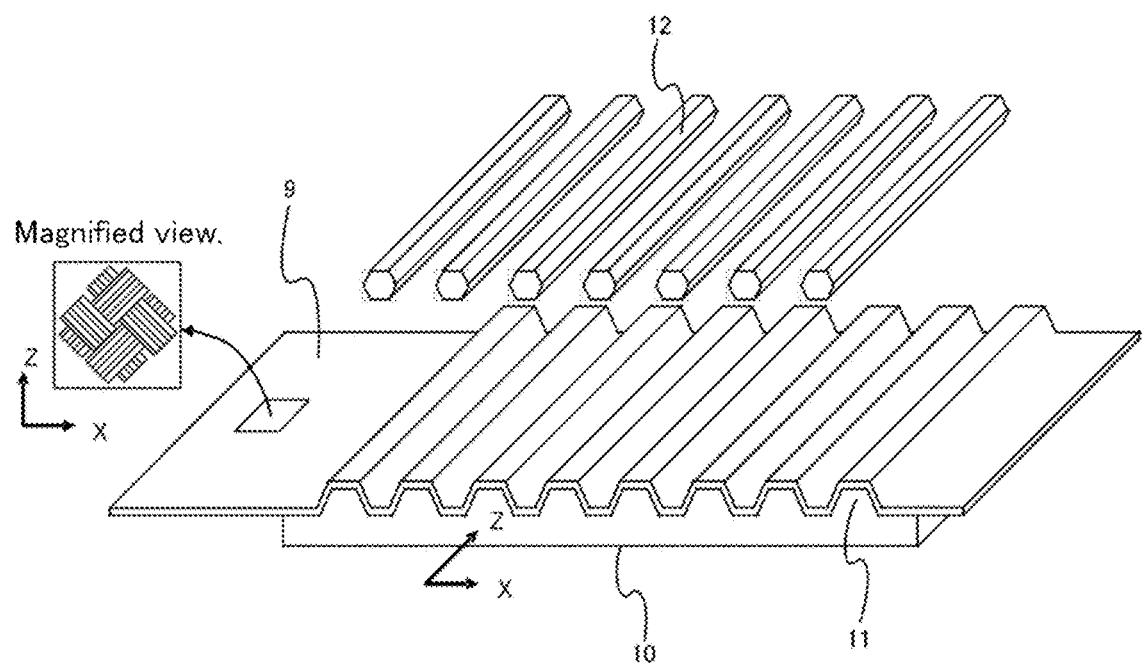
FIG. 2 is a perspective view showing that a honeycomb-core prepreg sheet being a material of the honeycomb core shown in FIG. 1 is laid on a first jig.
Figure 3:
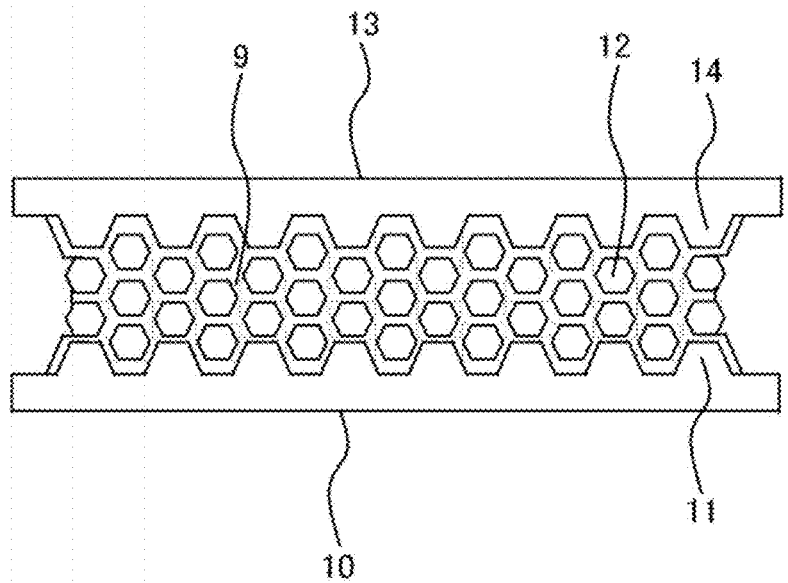
FIG. 3 is a front cross-sectional view of a stack structure with a second jig stacked up thereon, viewed in the Z-axis direction, the stack structure being formed by further stacking up, from the state shown in FIG. 2, honeycomb-core prepreg sheets on the first jig with plural cores placed therebetween.

Next, an example of the method for producing the honeycomb core 3 of the honeycomb sandwich structure 1 will be described using FIG. 2 and FIG. 3. FIG. 2 is a perspective view showing that a honeycomb-core prepreg sheet 9 being a material of the honeycomb core 3 shown in FIG. 1 is laid on a first jig 10. In the figure, a jig coordinate system is also indicated, where a direction across a ridge 11 of the first jig 10 and a direction therealong correspond to the X-axis direction and the Z-axis direction, respectively. Note that the X-axis direction and the Z-axis direction of the jig coordinate system are the same as the X-axis direction and the Z-axis direction indicated in FIG. 1, respectively. FIG. 3 is a front cross-sectional view of a stack structure with a second jig 13 stacked up thereon, viewed in the Z-axis direction, the stack structure being formed by further stacking up, from the state shown in FIG. 2, honeycomb-core prepreg sheets 9 on the first jig 10 with a plurality of cores 12 placed therebetween.

First, a carbon fiber fabric having two fiber directions is produced, for example using a highly elastic carbon fiber YS80A (made by Nippon Graphite Fiber Corporation), in the same way as the face-plate prepreg sheet is produced as described above. After that, a cyanate resin NM-31 (made by JXTG Nippon Oil & Energy Corporation) is impregnated into the fiber fabric having two fiber directions, to produce the honeycomb-core prepreg sheet 9 (hereinafter, may be referred to only as prepreg sheet 9) having two fiber directions mutually orthogonal.

Then, the prepreg sheet 9 is shaped into the shape of the honeycomb core 3 by using the first jig 10, the plurality of cores 12, and the second jig 13. The first jig 10 is a die which has a plurality of semi-hexagonally prism-shaped ridges 11 formed in parallel to each other. Each of the plurality of cores 12 has a hexagonal prism shape. Similarly to the first jig 10, the second jig 13 has a plurality of semi-hexagonally prism-shaped ridges 14 formed in parallel to each other.

To be specific, firstly, as shown in FIG. 2, a prepreg sheet 9 is laid on the first jig 10 to fit to the shape thereof, and then, cores 12 are put into furrows between adjacent ridges 11 on the prepreg sheet. After that, another prepreg sheet 9 is laid to fit to the shape of the first jig 10 with the cores 12 having been laid thereon, and then, cores 12 are laid on the other sheet at the respective positions of the ridges 11. After repeating the step of laying the prepreg sheet 9 and the cores 12, the second jig 13 to be paired with the first jig 10 is laid to fit to the shape of the first jig 10 with the cores 12 having been laid thereon. This results in a state shown in FIG. 3.

Then, in the state shown in FIG. 3, the stack structure is heated under pressurized environment to be cured. And then, the cores 12 are pulled out to complete producing the honeycomb core 3. Next, an example of the method for producing a stack product of the honeycomb-core prepreg sheets will be described. The stack product is produced using two honeycomb-core prepreg sheets. Similarly, as with the face plate 2, it is preferable that the honeycomb core 3 have pseudo-isotropy in its surface. When defining that the zero-degree direction is the Z-axis direction and the ninety-degree direction is the X-axis direction, it is preferable that the two honeycomb-core prepreg sheets be arranged as follows: the first sheet is arranged so that the two fiber directions of the carbon fiber fabric will be 22.5-degree direction and 112.5-degree direction, respectively (hereinafter, may be expressed as "(22.5 degrees/112.5 degrees)"), and the second sheet is arranged so that the two fiber directions of the carbon fiber fabric will be (67.5 degrees/−22.5 degrees), respectively. In addition, the number of the honeycomb-core prepreg sheets to be stacked and the method for stacking the same are not limited to that shown in the above example.

Figure 4:
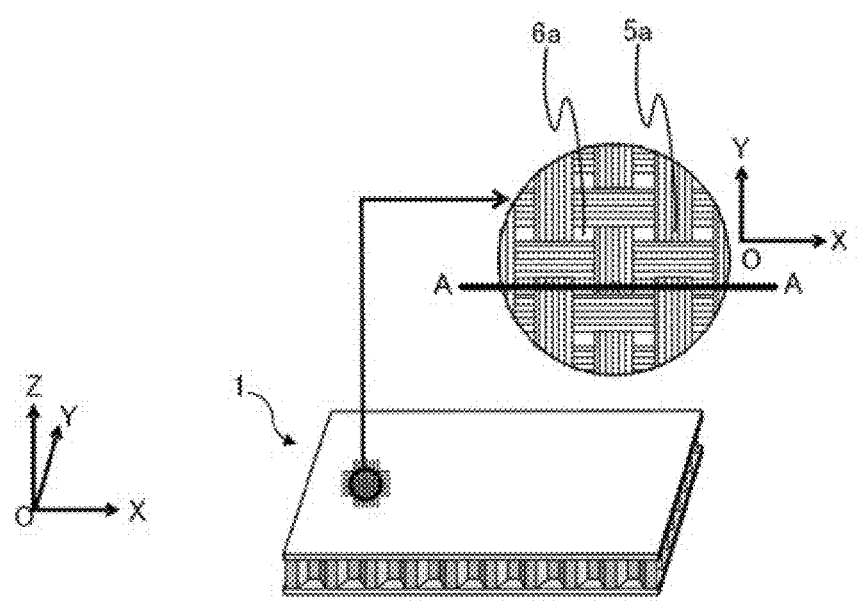
FIG. 4 is a magnified view showing the surface of a face plate of the honeycomb sandwich structure shown in FIG. 1.
Figure 5:
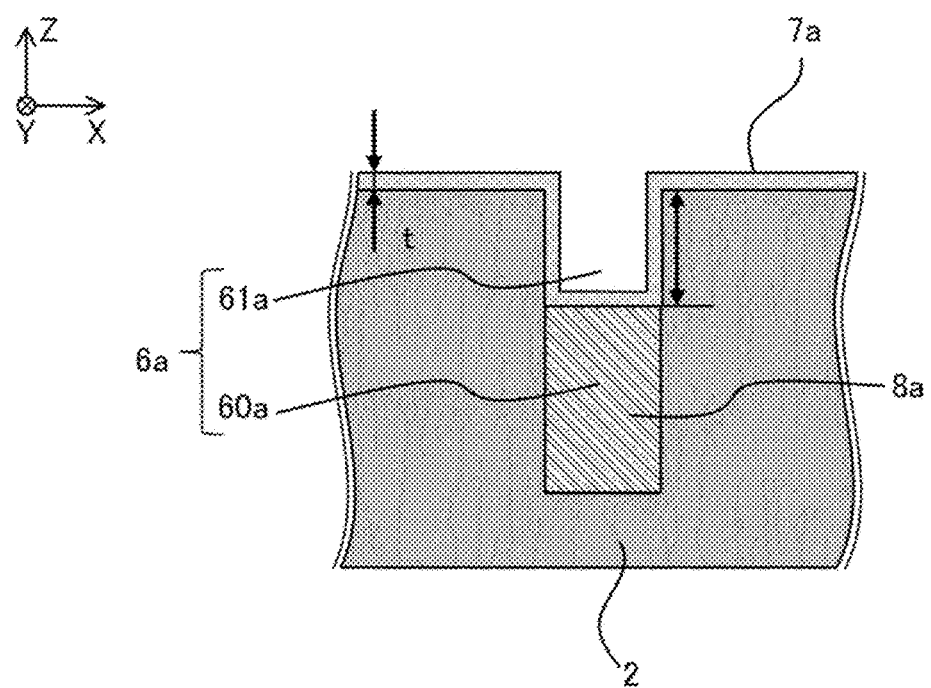
FIG. 5 is a cross-sectional view taken along A-A line in FIG. 4, the view seen from a direction orthogonal to the surface (X-Y plane) of the face plate.

The surface processing for the face plate 2 will be described using FIG. 4 and FIG. 5. FIG. 4 is a magnified view showing the surface of the face plate 2 of the honeycomb sandwich structure 1. FIG. 5 is a cross-sectional view taken along A-A line shown in FIG. 4, the view seen from a direction orthogonal to the surface (X-Y plane) of the face plate.

FIG. 5 shows that, in the carbon fiber fabric 5a illustrated in FIG. 4, a part where the carbon fibers exist forms a flat and smooth part of the face plate 2, and a part where the carbon fibers do not exist, namely a mesh, forms a recess 6a in the face plate 2. In other words, the recess 6a is provided at the mesh of the carbon fiber fabric 5a having two mutually different fiber-directions, and the recess is a recessed part formed in the flat and smooth part of the face plate 2.

As shown in FIG. 5, a lower part of the recess 6a is provided with a resin layer 8a, which thereby forms, in the lower part of the recess 6a, a filled part 60a being a part filled with the resin layer 8a. Furthermore, in the recess 6a, an unfilled part 61a which is not filled with the resin layer 8a is provided above the filled part 60a.

In addition, the carbon fiber fabric 5a may be arranged in a direction different from that shown in FIG. 5. In this case, it suffices that the unfilled part 61a is provided at a part which is closer to the opening of the recess 6a than the resin layer 8a and which is not filled with the resin layer 8a. In other words, it suffices that the unfilled part 61a is provided at a position closer, in the depression direction of the recess 6a, to the flat and smooth part of the face plate 2 than the position of the resin layer 8a (the filled part 60a). Here, the depression direction of the recess 6a is the out-of-plane direction of the face plate 2, the out-of-plane direction heading towards the inside of the face plate 2. An example of the depression direction is "−Z-axis" direction shown in FIG. 4 and FIG. 5.

Further, a water-impermeable film 7a which neither passes nor absorbs moisture, is formed to cover the outer surfaces of both the resin layer 8a and the face plate 2. In short, the water-impermeable film 7a covers the surface exposure area of a part composed of the resin layer 8a and the honeycomb core 3. Here, the surface exposure area consists of the surface of the flat and smooth part of the face plate 2, the surface of the resin layer 8a, and the sides of the unfilled part 61a of the face plate 2.

The recess 6a has been exemplified as having a rectangular cross-sectional shape; however, the recess may have any cross-sectional shape including a square, triangle or other shape.

The water-impermeable film 7a is, for example, a diamond-like carbon (DLC) film. The DLC film is a hard, amorphous film made of a hydrocarbon or a carbon allotrope. In the following description, it is assumed that the water-impermeable film 7a is a DLC film, however, any kind of film material may be used as long as the water-impermeable film 7a has water-impermeability. The resin layer 8a is formed, for example, of thermosetting resin such as cyanate resin or epoxy resin.

Next, steps for processing the surface of the face plate 2 will be described. First, the face plate 2 obtained by heating the face-plate prepreg sheets is prepared. Next, a part of the recess 6a of the face plate 2 is filled with the resin layer 8a. Then, the DLC film 7a is formed to cover the resin layer 8a and the unfilled part 61a of the recess 6a.

A method for filling a part of the recess 6a with the resin layer 8a will be described in detail. First, a liquid-type resin is applied to the surface of the face plate 2, and then pressure is applied thereto. The resin may be applied to the surface of the face plate 2, by laminating the surface with a half-cured resin film and then heating it under pressure. Next, under a pressurized environment of about 6 atmospheres and under vacuum environment, the excessive resin is removed using a bleeder cloth such as a nonwoven fabric so that the depth D of the unfilled part 61a in the recess 6a will be, for example, deeper than zero and equal to or shallower than ten times the film thickness t of the DLC film 7. Lastly, the resin is heated, to form the resin layer 8a in the recess 6a.

Figure 6:
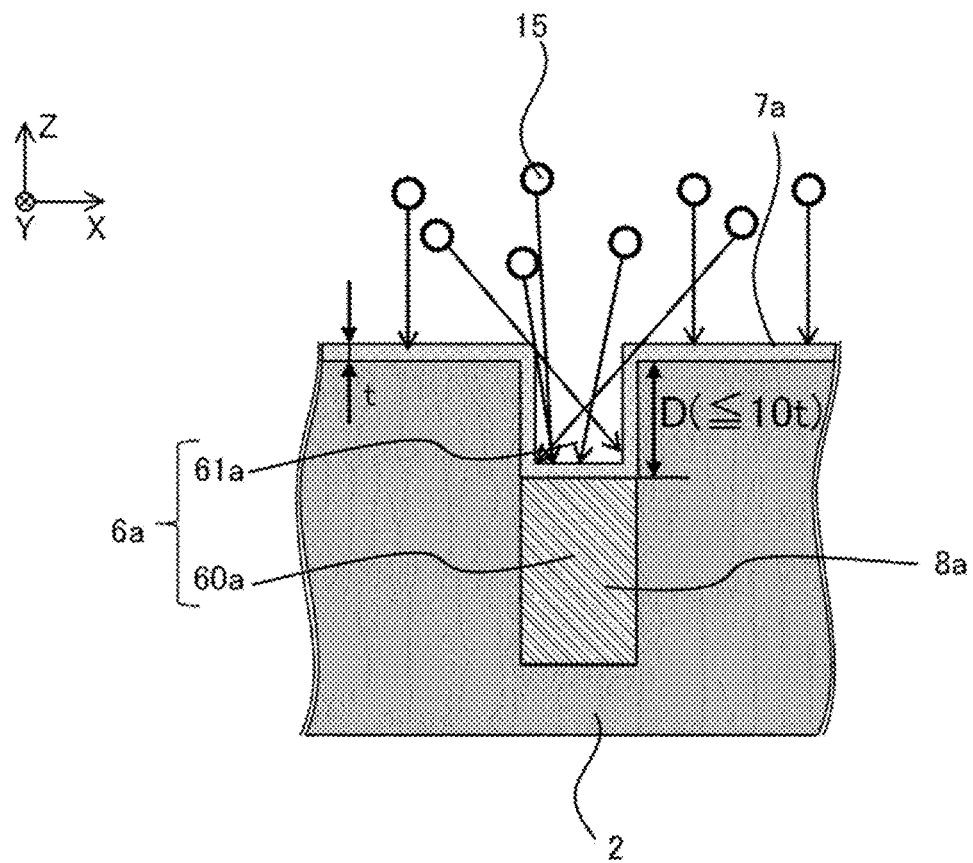
FIG. 6 is a drawing for illustrating how a DLC film is formed using a plasma chemical vapor deposition (CVD) method.

Using FIG. 6, how the DLC film 7a is formed will be described in detail. FIG. 6 is a drawing for illustrating how the DLC film 7a is formed using a plasma chemical vapor deposition (CVD) method. As shown in FIG. 6, after filling a part of the recess 6a with the resin layer 8a, hydrocarbon 15 (DLC-film material) is plasmatized in a chamber to be deposited on the face plate 2. By this deposition, the DLC film 7a is formed on the unfilled part 61a of the recess 6a of the face plate 2 and the surface of the face plate 2. In place of the plasma CVD method, a physical vapor deposition (PVD) method may be used. The PVD method is a method for forming a film on the surface by exposing to ion beams, arc discharges, or the like in vacuum and thereby scattering raw material of the film such as graphite.

The filled part 60a of the recess 6a is a region where it is difficult to form the DLC film 7a. In the present embodiment, the region is filled with the resin layer 8a, and then the DLC film 7a is formed on the face plate 2 and on the sides of the unfilled part 61a. This can reduce a region on which the DLC film 7a is not formed.

Figure 7:
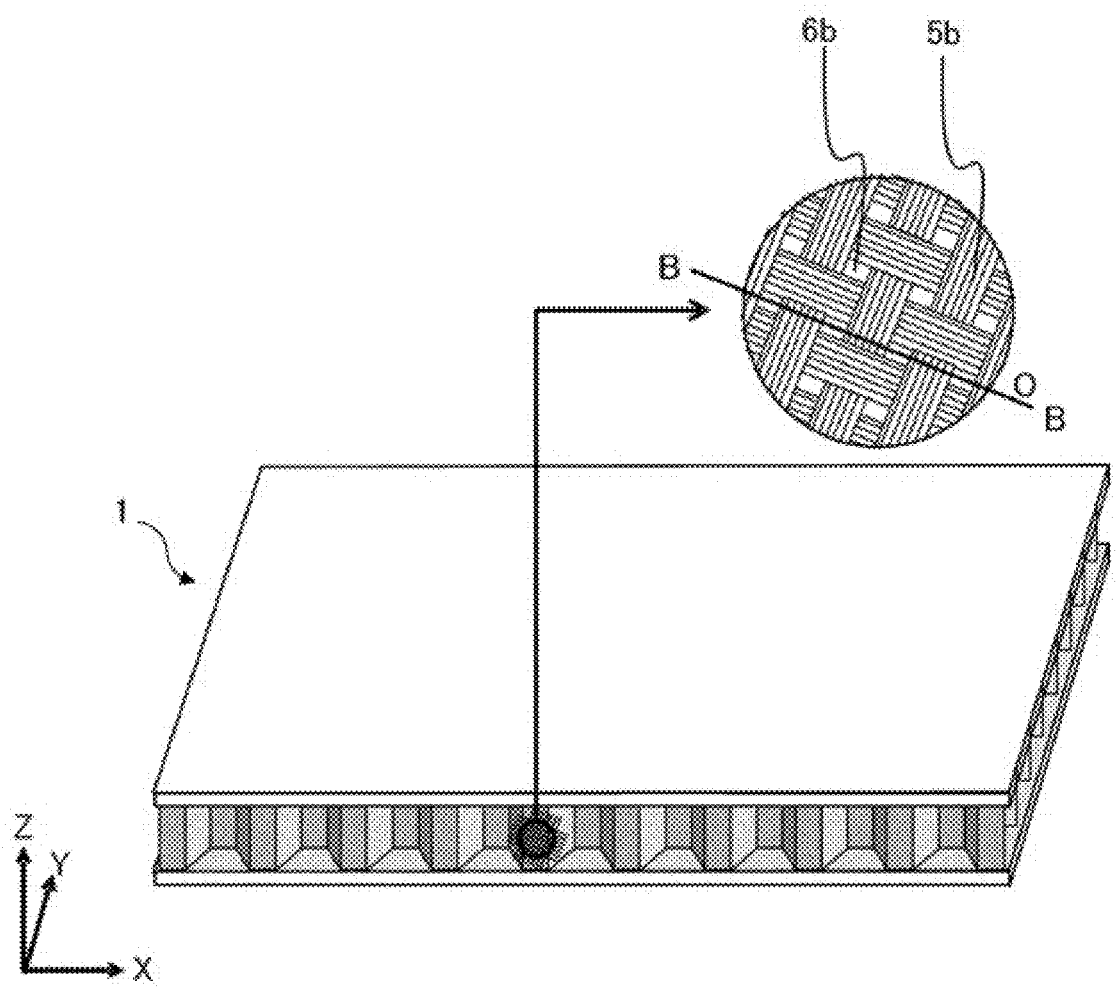
FIG. 7 is a magnified view of the surface of the honeycomb core.
Figure 8:
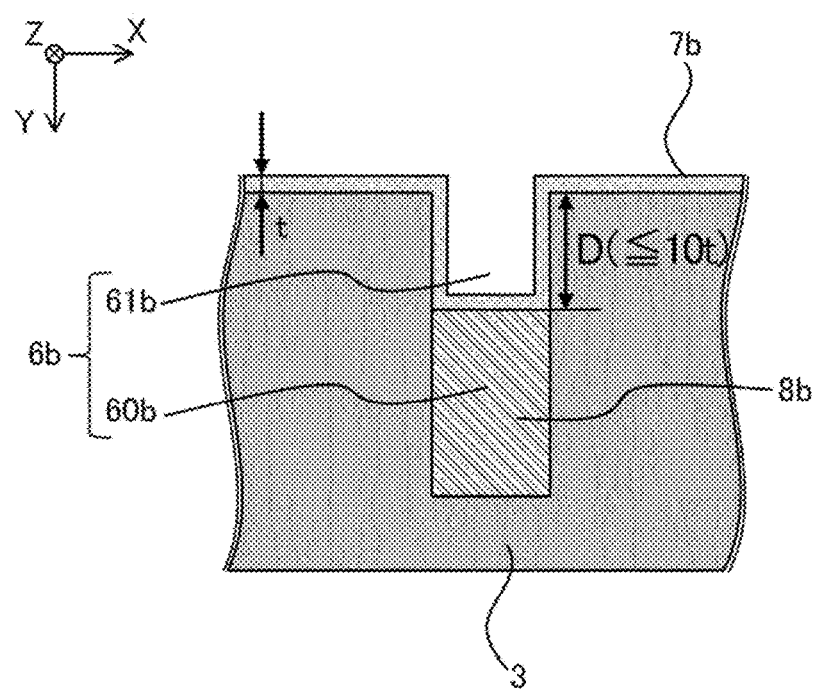
FIG. 8 is a cross-sectional view taken along B-B line in FIG. 7, the view seen from a direction orthogonal to the surface (Z-X plane) of the honeycomb core.

Using FIG. 7, FIG. 8 and FIG. 9, how to process the surface of the honeycomb core 3 will be described. FIG. 7 is a magnified view of the surface of the honeycomb core 3. FIG. 8 is a cross-sectional view taken along B-B line in FIG. 7, the view seen from a direction orthogonal to the surface (Z-X plane) of the honeycomb core 3. In each of the meshes of a carbon fiber fabric 5b of CFRP forming the honeycomb core 3, a recess 6b is provided similarly to the surface of the face plate 2.

By filling a lower part of the recess 6b with a resin layer 8b, a filled part 60b which is a part filled with the resin layer 8b is formed in the lower part of the recess 6b, as shown in FIG. 8. In the recess 6b, an unfilled part 61b which is not filled with the resin layer 8b is provided above the filled part 60b.

In addition, the carbon fiber fabric 5b may be arranged in a direction different from that shown in FIG. 7 and FIG. 8. In this case, it suffices that the unfilled part 61b is provided at a part which is closer to the opening of the recess 6b than the resin layer 8b and which is not filled with the resin layer 8b. In other words, it suffices that the unfilled part 61b is provided at a position closer, in the depression direction of the recess 6b, to the flat and smooth part of the honeycomb core 3 than the position of the resin layer 8b (the filled part 60b). Here, as with the recess 6a of the face plate 2, the depression direction of the recess 6b is the out-of-plane direction of the honeycomb core 3 and is toward the inside of the honeycomb core 3. For example, in FIG. 7 and FIG. 8, the depression direction of the recess 6b is +Y-axis direction.

A water-impermeable film 7b, which neither passes nor absorbs moisture, is formed to cover the resin layer 8b and the honeycomb core 3 from their outer sides. In short, the water-impermeable film 7b covers the surface exposure area of a part composed of the resin layer 8b and the honeycomb core 3, in the same way that the water-impermeable film 7a does. Here, the surface exposure area here consists of the surface of the flat and smooth part of the honeycomb core 3, the surface of the resin layer 8b, and the sides of the unfilled part 61b of the honeycomb core 3. In the following description, it is assumed that the water-impermeable film 7b is a DLC film; however, the water-impermeable film may be made of material other than that. The method for processing the surface of the honeycomb core 3 is the same as that for the face plate 2; therefore, the description will not be repeated here.

Note here that the recess 6b of the honeycomb core 3, the water-impermeable film 7b formed on the honeycomb core 3, and the resin layer 8b formed on the honeycomb core 3 correspond to a first recess, a first water-impermeable film, and a first resin layer, respectively.

Also, the recess 6a of the face plate 2, the water-impermeable film 7a formed on the face plate 2, and the resin layer 8a formed on the face plate 2 correspond to a second recess, a second water-impermeable film, and a second resin layer, respectively.

In order to distinguish components of the face plate 2 from those of the honeycomb core 3, different symbols have been given to the recesses, the DLC films, and the resin layers in the above description (for example, "recess 6a", "recess 6b"). However, if it is not necessary to distinguish the components therebetween, the components may be expressed as "recess 6", "DLC film 7", or "resin layer 8". Also, similarly to the components mentioned above, the filled part 60a (60b) and the unfilled part 61a (61b) may be denoted by "filled part 60" and "unfilled part 61", respectively.

Figure 9:
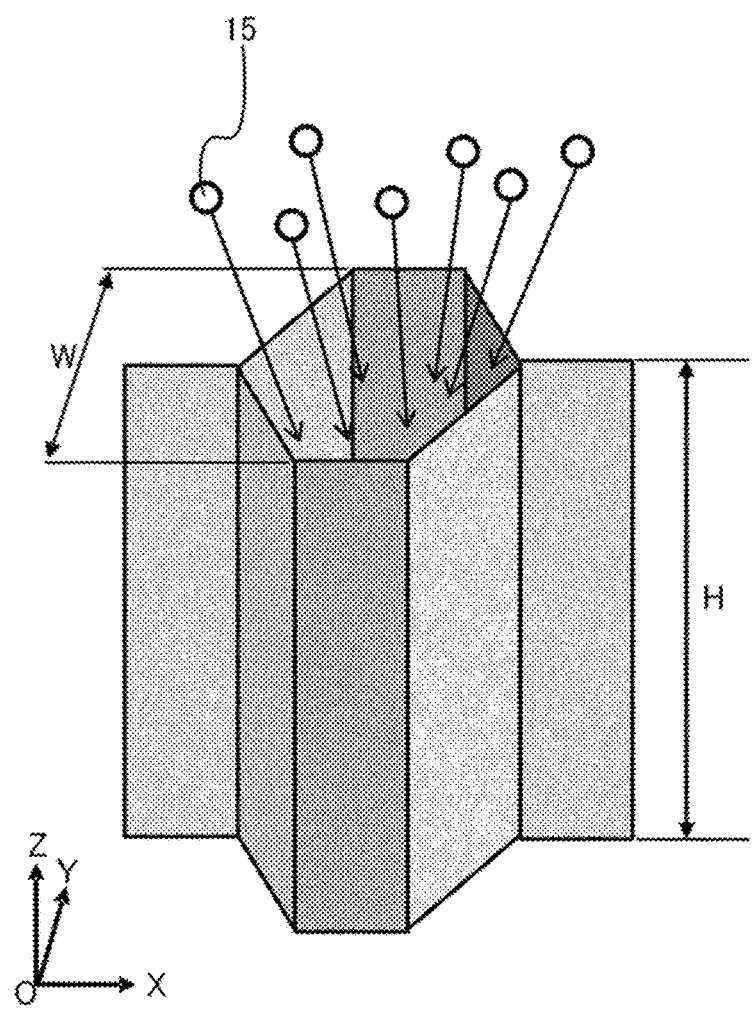
FIG. 9 is a drawing for illustrating how the DLC film is formed on the surface of the honeycomb core.

FIG. 9 is a drawing for illustrating how a DLC film 7b is formed on the surface of the honeycomb core 3, and the drawing shows one of hexagonal cells included in the honeycomb core 3. In the figure, it is defined that the Z-direction dimension of the honeycomb core 3 is a height H and the Y-direction dimension of the hexagon is a cell width W. As with the face plate 2 shown in FIG. 6, DLC-film materials 15 are deposited on the surface of the honeycomb core 3 using for example the plasma CVD method, to form the DLC film 7b on the surface of the honeycomb core 3. In addition, a PVD method may be used instead of the plasma CVD method.

Figure 10:
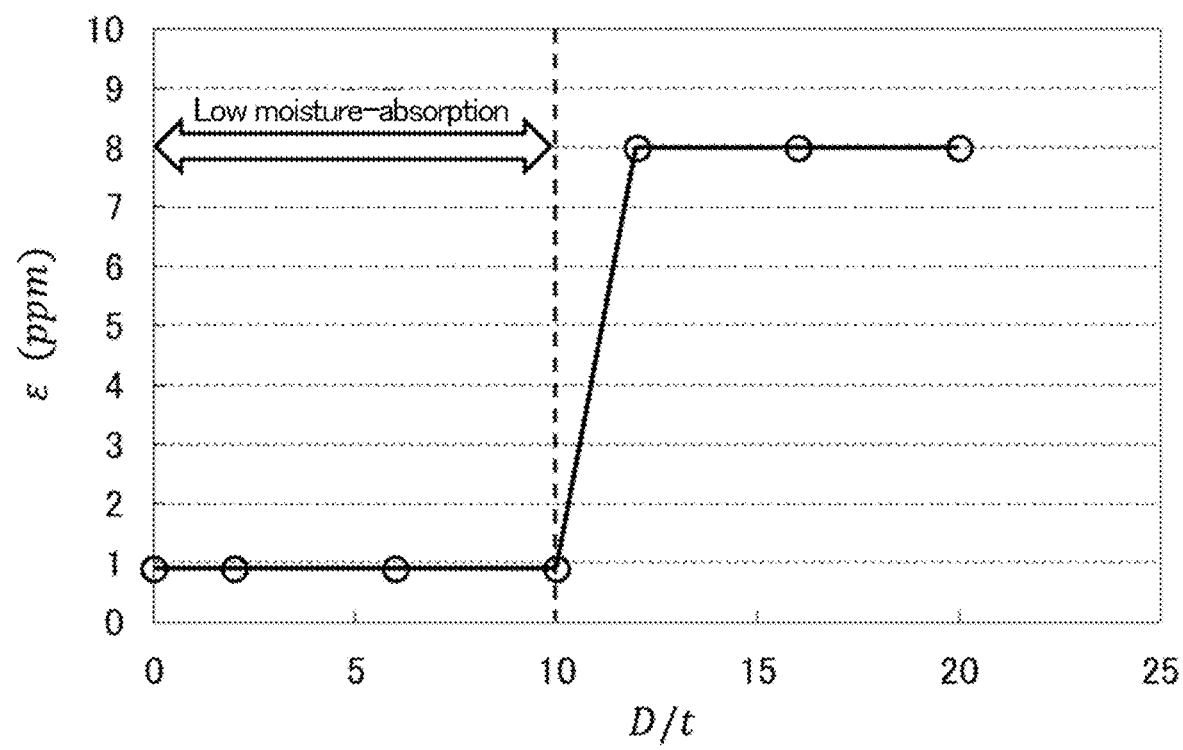
FIG. 10 is a plot graph showing the relationship between the ratio of the unfilled part depth D to the DLC film thickness t and the moisture absorption strain ε.

Using FIG. 10 to FIG. 15, the effects of the embodiment will be described. FIG. 10 is a plot graph showing the relationship between the ratio of the depth D of the unfilled part 61 to the thickness t of the DLC film 7 and the moisture absorption strain ε expressing the magnitude of deformation caused by moisture absorption. In the figure, the horizontal axis represents a ratio "D/t"; the vertical axis represents the moisture absorption strain ε in the out-of-plane direction of the honeycomb sandwich structure 1. That is, FIG. 10 is a graph obtained by the following work; each of the film thickness t of the DLC film 7 and the depth D of the recess 6 is varied to measure the moisture absorption strain ε of the honeycomb sandwich structure 1; and then, each of the measurements is plotted at a corresponding position on the graph. Note that the moisture absorption strain ε is measured by using a measurement system to be described later with reference to FIG. 16 to FIG. 18. The moisture absorption strain ε is a value obtained by dividing the difference between the height of the honeycomb sandwich structure 1 before moisture absorption and that after moisture absorption by that before moisture absorption.

Before explaining FIG. 10, the dimensions of the honeycomb sandwich structure 1 used for the measurement will be described together. The thickness of the face plate 2 is 0.20 mm; the thickness of the adhesive sheet 4 is 0.06 mm. The honeycomb core 3 has a thickness Th of 0.20 mm in an X-Y plane cross section. The cell width W is ⅜ inches; the height H is 250 mm.

As shown in FIG. 10, in a range where the ratio "D/t" ranges from zero to 10, the moisture absorption strain ε indicating the magnitude of deformation amount between states before and after the honeycomb sandwich structure 1 absorbs moisture is kept as low as 0.90 ppm (parts per million). This shows that when the depth D of the unfilled part 61 in the recess 6 is made larger than zero times the film thickness t of the DLC film 7 but equal to or smaller than ten times the film thickness, this suppresses the production of a region, on the sides of the recess 6, where the film of the DLC-film material 15 is not formed. As shown in FIG. 10, when the ratio "D/t" exceeds ten, the moisture absorption strain ε starts increasing. This is because the region where the DLC film 7 is absent occurs on the sides of the recess 6. When the ratio "D/t" reaches about twelve, the area of the region where the DLC film 7 is not formed becomes so large that the moisture absorption strain ε reaches as high as 8 ppm.

Figure 11:
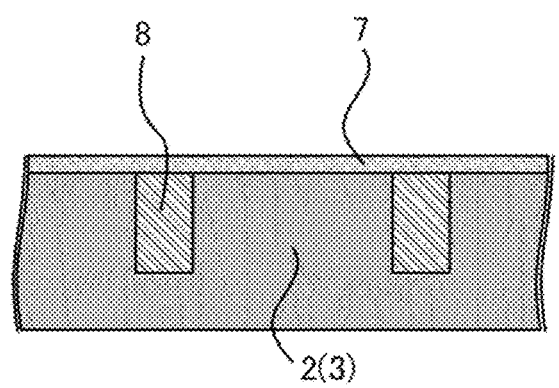
FIG. 11 is an example of a cross-sectional view of recesses and their neighborhood in the surface of the face plate or the honeycomb core.
Figure 12:
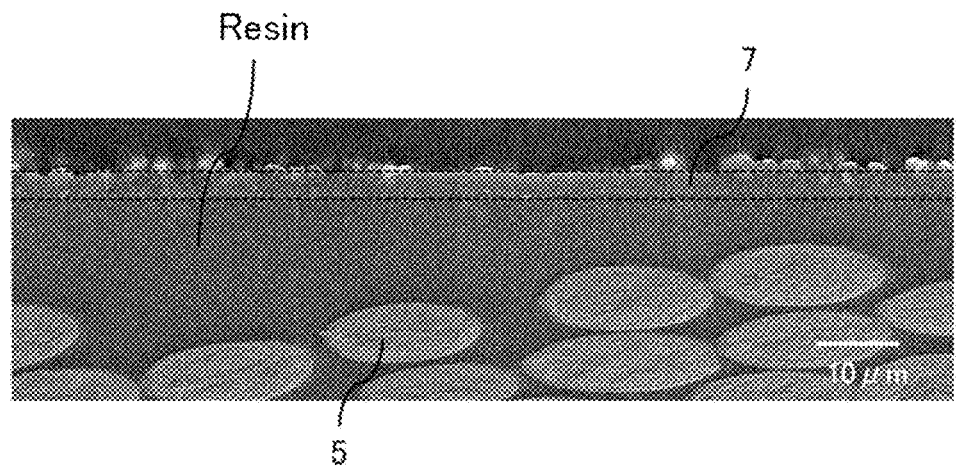
FIG. 12 is a cross-sectional photo image of the face plate (honeycomb core) shown in FIG. 11.

Regarding CFRP containing a carbon fiber fabric having two or more fiber directions, the inventors have diligently worked to find that, depending on the depth of the recess, a part where the water-impermeable film is not formed on the sides of the recess is produced, resulting in increasing moisture absorption deformation. FIG. 11 is an example of a cross-sectional view of the recesses 6 and their neighborhood of the face plate 2 or the surface of the honeycomb core 3, where the ratio "D/t" is 0.01. FIG. 12 is a cross-sectional photo image of the face plate 2 (the honeycomb core 3) shown in FIG. 11. As shown in FIG. 11 and FIG. 12, on the face plate 2 (the honeycomb core 3), there is no region where the DLC film 7 is not formed.

Figure 13:
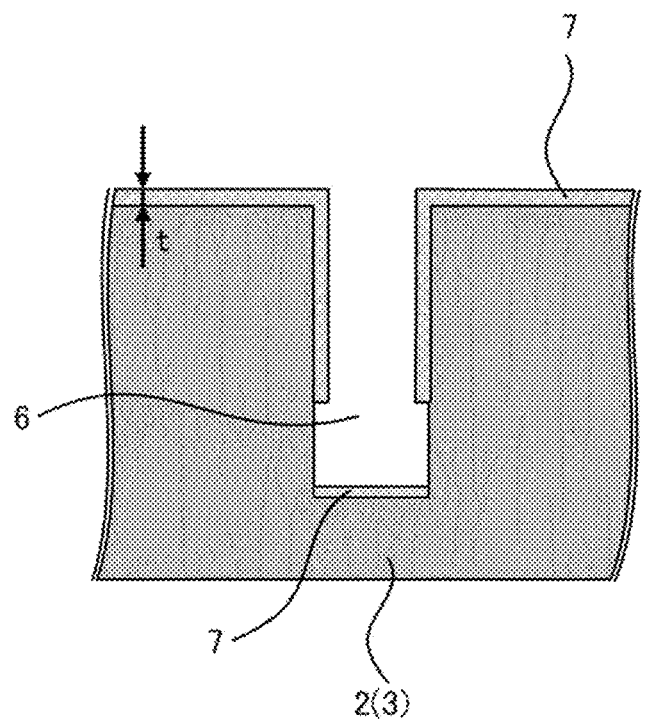
FIG. 13 is an example of a cross-sectional view of a recess and its neighborhood in the surface of the face plate or the honeycomb core.
Figure 14:
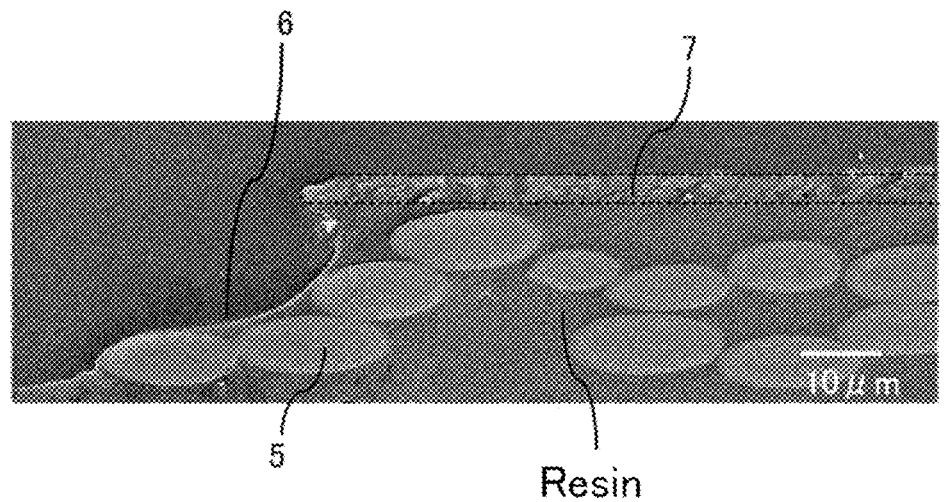
FIG. 14 is a cross-sectional photo image of the face plate (honeycomb core) shown in FIG. 13.

Here, in a comparison example where a recess 6 is not filled with the resin layer 8, a part around the recess 6 will be described. FIG. 13 is a comparison example of the cross-sectional view of the recess 6 and its neighborhood in the face plate 2 or the surface of the honeycomb core 3, where the recess 6 is not filled with the resin layer 8. FIG. 14 is a cross-sectional photo image of the face plate 2 (the honeycomb core 3) shown in FIG. 13. As shown in FIG. 14, in the recess 6, a large region is formed without the DLC film 7.

Figure 15:
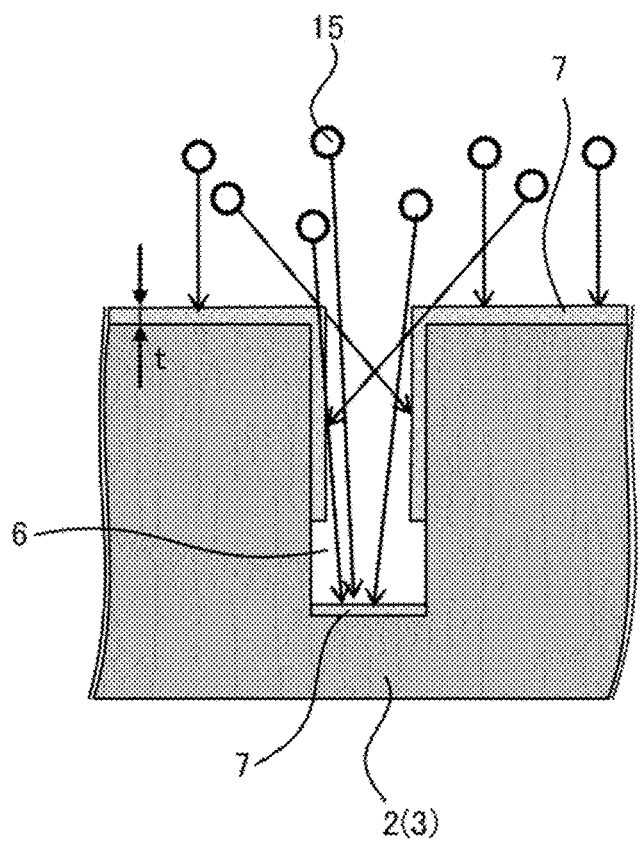
FIG. 15 is a drawing for illustrating a mechanism on how regions without a film layer are produced on the sides of the recess.

FIG. 15 is a drawing for illustrating a mechanism on how regions without a film layer are produced on the sides of the recess 6. That is, a case will be examined which differs from the present embodiment, and in which when the DLC film 7 is formed by a method such as the plasma CVD method, the recess 6 is not filled with the resin layer 8. In this case, an excessively deep recess 6 makes it hard for the DLC-film material 15 to collide in a lower part of the recess 6. This expands the region where the DLC film 7 is not formed.

On the other hand, in the present embodiment, a part of the recess 6 formed in the CFRP face plate 2 and the CFRP honeycomb core 3 is provided with the resin layer 8, whereby the recess 6 of the face plate 2 and the honeycomb core 3 has a structure by which the DLC film 7 is easily formed in the recess. This can suppress the moisture absorption deformation.

Figure 16:
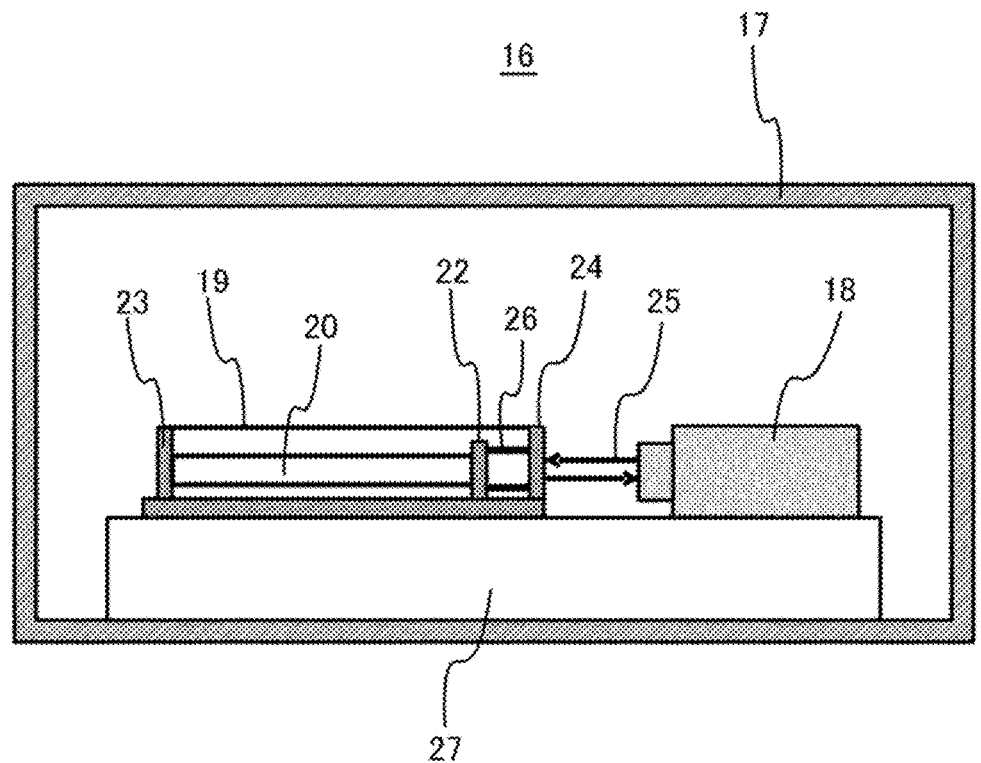
FIG. 16 is a cross-sectional view showing a structure of a measurement system for measuring a moisture absorption strain ε of the honeycomb sandwich structure according to Embodiment 1.

A measurement system by which the measurement data shown in FIG. 10 has been obtained will be described using FIG. 16 to FIG. 18. FIG. 16 is a cross-sectional view showing a structure of the measurement system for measuring a moisture absorption strain ε of the honeycomb sandwich structure 1 according to Embodiment 1. The measurement system 16 for measuring moisture absorption strain is composed of a thermo-hygrostat 17, a laser interferometer 18, and a test-piece support structure 19.

The test-piece support structure 19 has a structure in which a test piece 20 and a reference material 21 are held between a plane mirror 22 and a fixing plane mirror 23. The reference material 21 is free from moisture absorption strain. A semi-transparent plane mirror 24 is provided between the plane mirror 22 and the laser interferometer 18. The semi-transparent plane mirror 24 passes and reflects incident beams 25 from the laser interferometer 18. The plane mirror 22 and the semi-transparent plane mirror 24 are connected to each other via springs 26. The test-piece support structure 19 is fixed on an anti-vibration table 27. The test piece 20 to be tested in the present embodiment is a honeycomb sandwich structure 1, which will be simply referred to as the test piece 20 in the following description. Instead of measuring the moisture absorption strain ε of the honeycomb sandwich structure 1, alternative work may be done in which the moisture absorption strain ε of each of components (such as the face plate 2, the honeycomb core 3, and the adhesive sheet 4) of the honeycomb sandwich structure 1 is measured, and then, the moisture absorption strain ε of the honeycomb sandwich structure 1 is calculated on the basis of the measurement results of the components.

Figure 17:
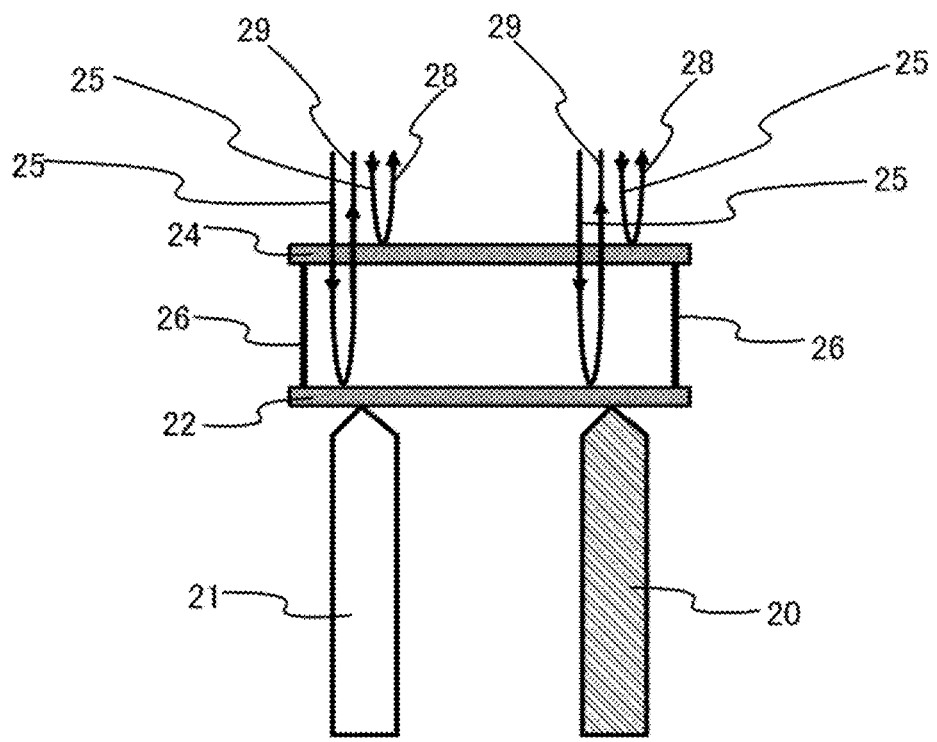
FIG. 17 is a magnified view of a plane mirror, a semi-transparent plane mirror and their neighborhoods shown in FIG. 16.
Figure 18:
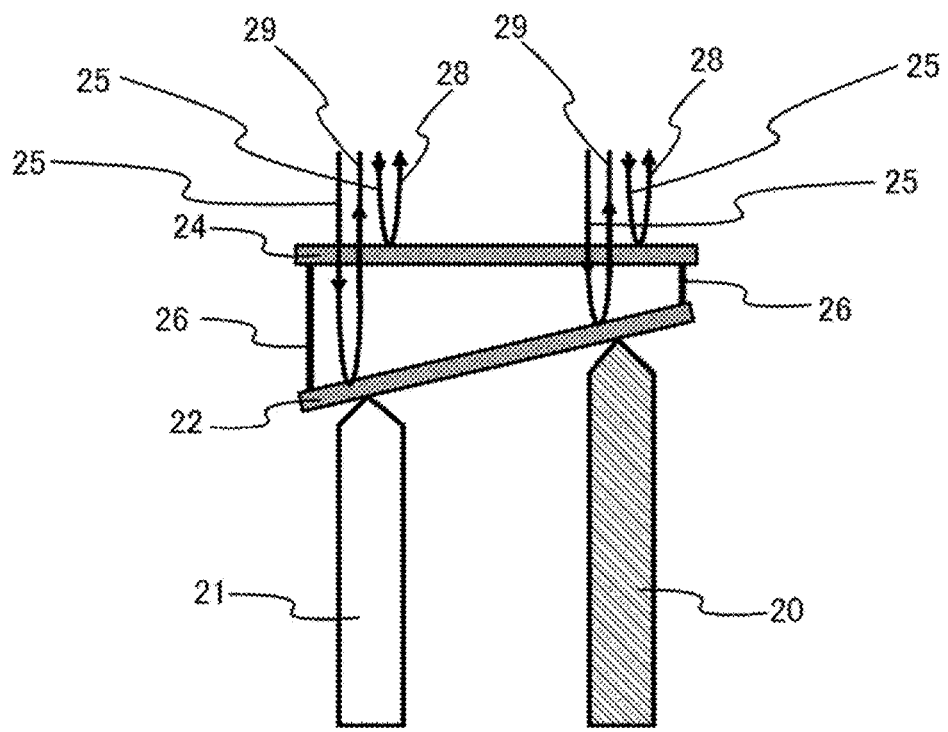
FIG. 18 is another magnified view of the plane mirror, the semi-transparent plane mirror and their neighborhoods shown in FIG. 16.

FIG. 17 and FIG. 18 are magnified views of the plane mirror 22, the semi-transparent plane mirror 24, and their neighborhoods shown in FIG. 16. FIG. 17 shows a state in which the test piece 20 has not yet deformed due to moisture absorption (before moisture absorption deformation); FIG. 18 shows a state in which the test piece 20 has deformed due to moisture absorption (after moisture absorption deformation). The humidity in the thermo-hygrostat 17 is varied to measure the deformation amounts produced when the test piece 20 absorbs moisture. To be more specific, the moisture absorption causes the test piece 20 to swell and change its length, thereby producing a length difference from the reference material 21. This length difference between the test piece 20 and the reference material 21 varies the inclination angle between the plane mirror 22 and the semi-transparent plane mirror 24.

As shown in FIG. 17, the semi-transparent plane mirror 24 divides an incident beam 25 emitted from the laser interferometer 18 into a transmission beam and a reflection beam 28; and the transmission beam is reflected by the plane mirror 22 to become a reflection beam 29. The reflection beams 28 and 29 enter into the laser interferometer 18 to form an interference pattern therein.

As shown in FIG. 18, when the test piece 20 becomes longer (or shorter) due to moisture absorption, the angle formed between the plane mirror 22 and the semi-transparent plane mirror 24 becomes larger (smaller). As the result, the optical path difference between the reflection beam 29 from the plane mirror 22 and the reflection beam 28 from the semi-transparent plane mirror 24 becomes larger (or smaller) than the optical path difference observed before the moisture absorption deformation of the test piece 20, causing a shift in the interference pattern in the laser interferometer 18. On the basis of interference-pattern shift amounts having been obtained in advance and a displacement amount of the test piece 20, it is possible to calculate a displacement amount of the test piece 20 caused by moisture absorption.

The present embodiment has been described in a case where a highly elastic carbon fiber M60J having a tensile elastic modulus of about 588 GPa and a cyanate resin EX15 are used for the carbon fiber and the resin included in the face plate 2. However, the face plate 2 may be composed of components other than those described above. Also, the description has been made using a highly elastic carbon fiber YS80A having a tensile elastic modulus of about 785 GPa and a cyanate resin NM-31 for the carbon fiber and the resin included in the honeycomb core 3. However, the honeycomb core 3 may be composed of components other than those described above.

In the present embodiment, both the filled part filled with the resin layer and the unfilled part not filled with the resin layer are provided in the recess; therefore, the region where the DLC film is not formed can be reduced, whereby the moisture absorption deformation can be suppressed. Furthermore, the water-impermeable film such as the DLC film and the resin layer are formed so that the ratio "D/t" will be larger than zero but equal to or less than 10; this does not produce a region where the water-impermeable film is not formed, further reducing the moisture absorption deformation. In the present embodiment, in both of the face plate and the honeycomb core, a part of each recess is filled with the resin layer; however, operations of the filling with the resin layer may be performed in either the face plate or the honeycomb core.

An example to be compared with the present embodiment may be a honeycomb sandwich structure in which the recess of CFRP is filled with a resin layer and the entire surface thereof is also covered with the resin layer, and then the water-impermeable film is formed over the resin layer. In this comparison example, the moisture absorption deformation can be suppressed because the water-impermeable film is formed on the surface. However, the resin layer is provided to cover the recesses and the entire surface; this causes an increase in the ratio of the resin to the carbon fiber, thereby increasing the thermal expansion ratio. On the other hand, in the present embodiment, the recess 6 is provided with a filled part filled with the resin layer and an unfilled part not filled with the resin layer, preventing the thermal expansion ratio of the honeycomb sandwich structure from increasing, and thereby enhancing the dimensional stability in terms of heat.

The honeycomb sandwich structure according to the present embodiment has the structure described above, which facilitates formation of the water-impermeable film, thereby effectively suppressing the moisture absorption deformation.

Embodiment 2

Figure 19:
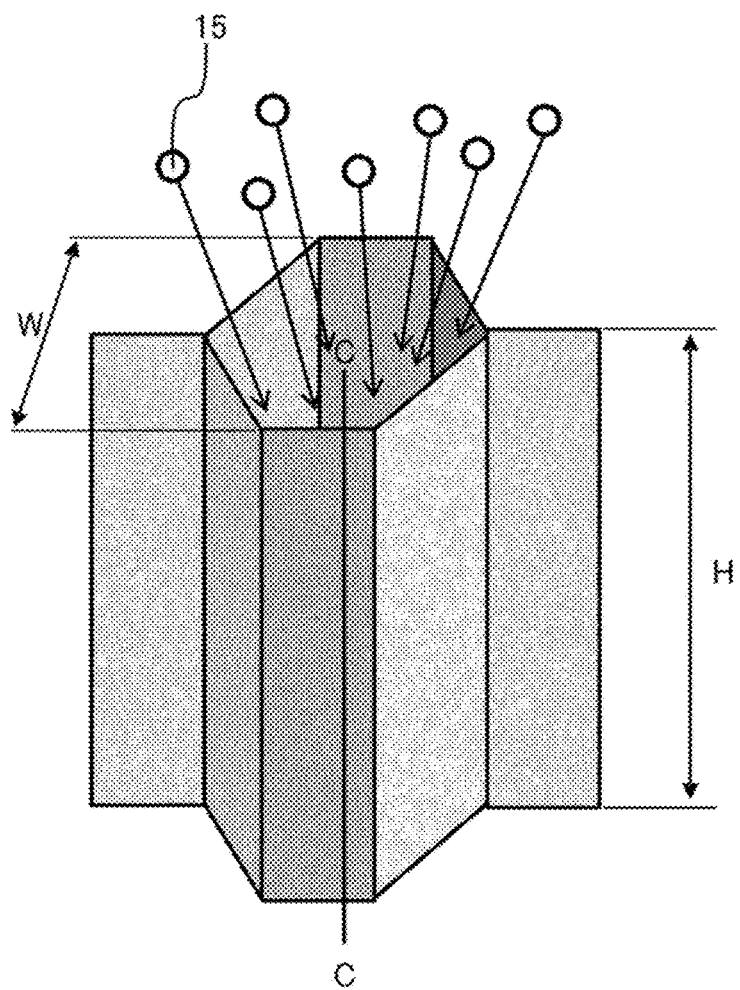
FIG. 19 is a drawing of a hexagonal-cell component taken out of the honeycomb core according to Embodiment 2.

Using FIGS. 19, 20 and 21, a honeycomb sandwich structure according to Embodiment 2 will be described. FIG. 19 is a drawing of a hexagonal-cell component taken out of a honeycomb core according to Embodiment 2.

Figure 20:
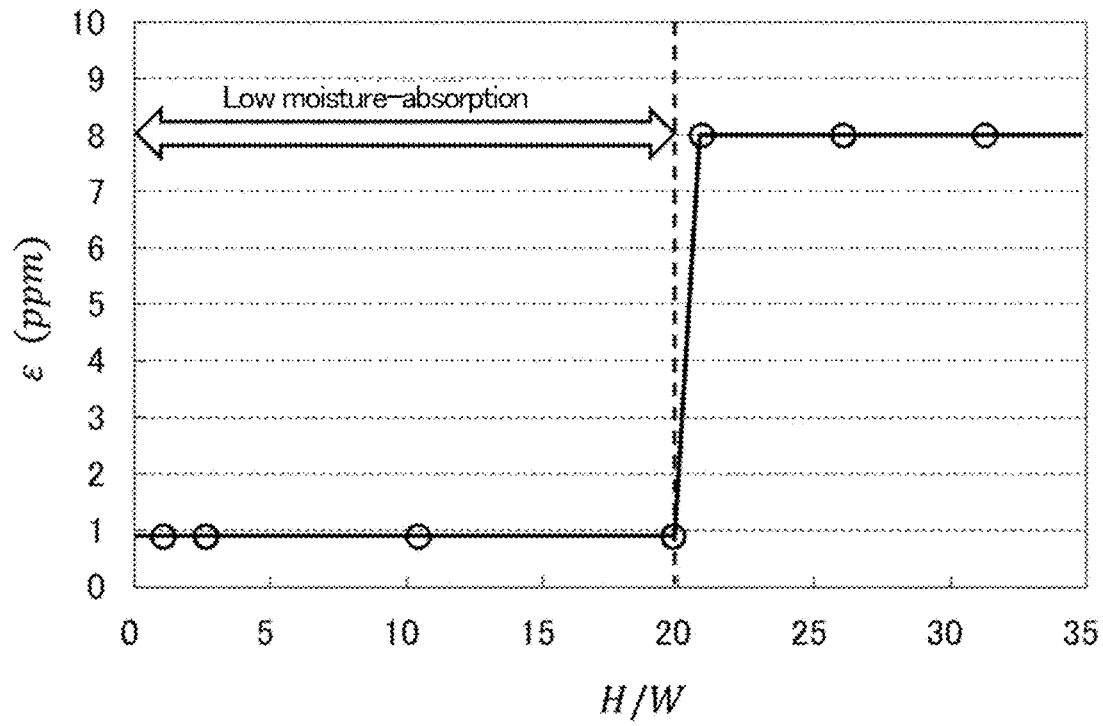
FIG. 20 is a graph obtained by varying the cell height H and the cell width W to measure moisture-absorption strains E of the honeycomb sandwich structure 1, and then plotting the measured results at corresponding positions on the graph.
Figure 21:
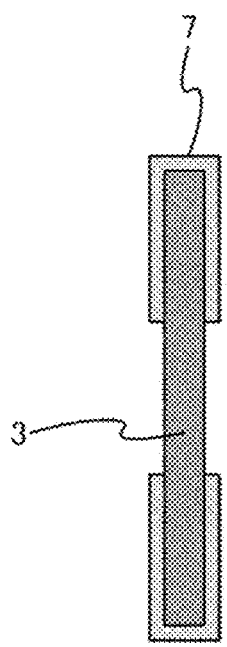
FIG. 21 is a cross-sectional view taken along C-C line shown in FIG. 19.

FIG. 20 is a plot graph showing a relationship between a dimension of the honeycomb core and the moisture absorption strain ε in the honeycomb sandwich structure. In the figure, the horizontal axis represents a ratio "H/W" of the cell height H to the cell width W in the honeycomb core 3. The vertical axis represents the moisture absorption strain ε. Thus, FIG. 20 is a graph obtained by varying the cell height H and the cell width W to measure moisture-absorption strains E of the honeycomb sandwich structure 1, and then plotting the measured results at corresponding positions on the graph. FIG. 21 is a cross-sectional view taken along C-C line shown in FIG. 19, showing an example in which the DLC film 7 is not formed in parts of the side wall of the cell of the honeycomb core 3.

As shown in FIG. 20, when the ratio "H/W" of the cell height H to the cell width W is equal to or less than 20, the moisture absorption strain ε takes a constant value of 0.90 ppm. On the other hand, when the ratio "H/W" exceeds 20, regions with no DLC film 7 formed thereon begin to be produced in height-wise and middle parts of the honeycomb core 3 as shown in FIG. 21. As a result, the moisture absorption strain ε starts to increase rapidly. When the ratio "H/W" becomes about 21, the moisture absorption strain ε reaches as high as 8 ppm.

In addition, even when the cell width W of the honeycomb core 3 is varied from ⅜ inches to ¼ inches, the obtained measurement result has been the same as those shown in the plot graph of FIG. 20.

Due to a structure designed as described above, the honeycomb sandwich structure according to the present embodiment brings, in addition to the effects obtained in Embodiment 1, an effect that can further suppress the production of the region where the water-impermeable film is not formed on the side wall of the cell of the honeycomb core.

Embodiment 3

The honeycomb sandwich structure 1 is requested to have a dimensional stability against heat in addition to deformation resistance against humidity. Therefore, it is preferable that the thermal expansion ratio of the honeycomb sandwich structure does not vary even after the water-impermeable film is formed. Therefore, it is necessary that even after formation of the water-impermeable film 7b such as a DLC film, the honeycomb core 3 have a little change Δα in the thermal expansion ratio in comparison to that before the formation of the water-impermeable film 7b.

Figure 22:
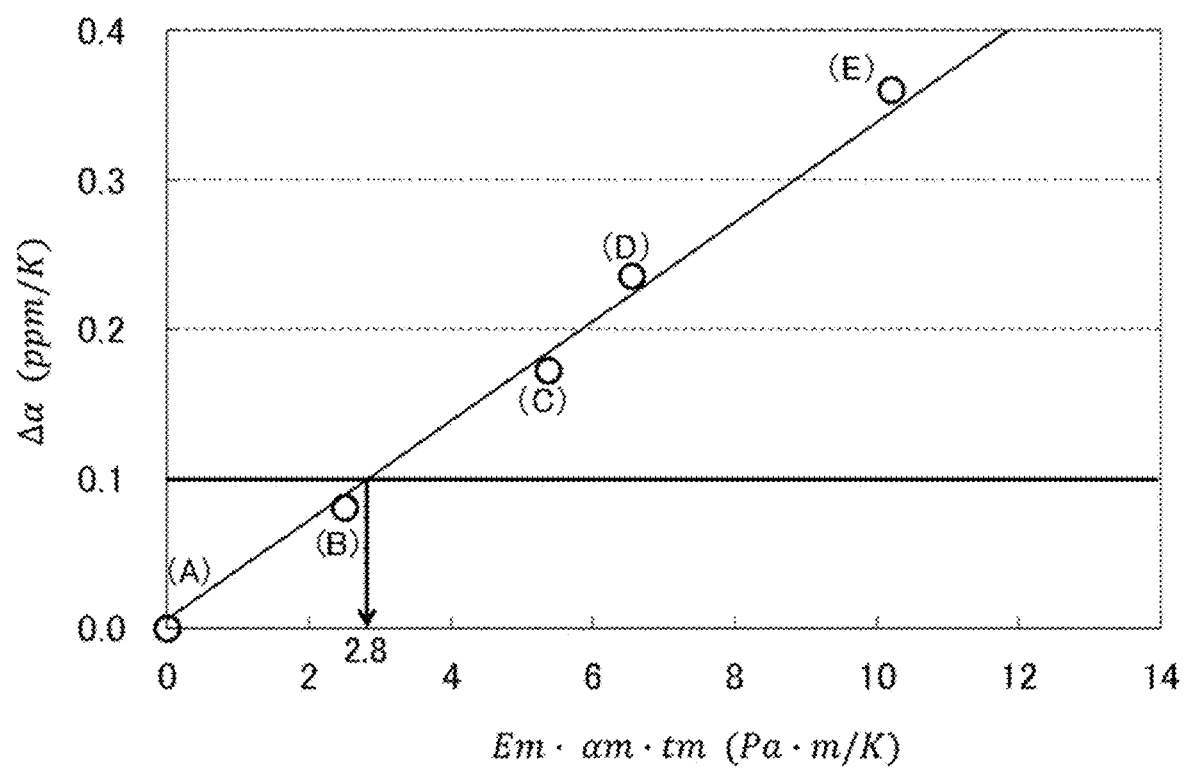
FIG. 22 is a measurement graph showing a relationship between the product of a plurality of characteristic values of a formed water-impermeable film and the variation Δα in the honeycomb core's thermal expansion ratio, the variation being caused by formation of the water-impermeable film.

Therefore, in the present embodiment, the characteristics of the water-impermeable film 7b that can keep small the change Δα in thermal expansion ratio will be found out with regard to the honeycomb core 3 used in Embodiment 1, using FIG. 22. FIG. 22 is a measurement graph showing a relationship between the product of a plurality of characteristic values of a formed water-impermeable film 7b and the change Δα in thermal expansion ratio of the honeycomb core 3, the change being caused by formation of the water-impermeable film 7b. The vertical axis represents the change Δα (ppm/K) of the thermal expansion ratio and the horizontal axis represents the product of the elastic modulus Em, the coefficient of thermal expansion αm, and the film thickness tm.

In the figure, a point (A) indicates the measurement value in a case where the film is not formed. Points (B) to (E) indicate measurement values in respective water-impermeable films used for the measurement.

In FIG. 22, the honeycomb core 3 as the measurement object has an elastic modulus E of 138 GPa, a thermal expansion ratio α of −0.71 (ppm/K), and a thickness Th of 0.20 mm.

It is preferable that the change Δα in the thermal expansion ratio be within a range from −0.1(ppm/K) to +0.1(ppm/K) (hereinafter, it may be referred to as "±0.1 (ppm/K) range"). FIG. 22 shows that, in order to keep within the ±0.1 (ppm/K) range the change Δα in the thermal expansion ratio of the honeycomb core 3 being the measurement object, the product of Em·αm·tm is equal to or less than 2.8 (Pa·m/K). In other words, if a water-impermeable film which is other than the DLC film but satisfies the above related equations is used, it is possible to make the thermal expansion ratio Δα be in the ±0.1 (ppm/K) range. Also, if the elastic modulus Em, the thermal expansion ratio αm, and the film thickness tm are obtained with respect to a water-impermeable film other than shown in FIG. 22, it can be readily determined whether the thermal expansion ratio Δα is within the ±0.1 (ppm/K) range. This can reduce the work amount required for selecting a suitable water-impermeable film among a plurality of water-impermeable films.

In order to calculate the change Δα of the thermal expansion ratio in FIG. 22, the same measurement method as described in FIG. 16 through FIG. 18 is used. That is, in the present embodiment, the change in the thermal expansion ratio of the honeycomb core 3 has been measured in the thermo-hygrostat 17 with the temperature varied.

A honeycomb sandwich structure as produced according to the present embodiment has advantages achieved in the embodiment 1, and also has an advantage of easily realizing a water-impermeable film whose thermal expansion ratio varies a little.

The invention claimed is:

1. A honeycomb sandwich structure comprising:
a honeycomb core which includes a first carbon fiber fabric woven in two or more mutually different fiber directions, the honeycomb core having a recess at a mesh of the first carbon fiber fabric;
a pair of face plates, wherein each face plate includes a second carbon fiber fabric woven in two or more mutually different fiber directions, and the face plates are adhered to the honeycomb core in such a way that the honeycomb core is sandwiched therebetween;
a resin layer which fills a part of the recess; and
a water-impermeable film which covers an exposed area including surfaces of the resin layer and the honeycomb core,
wherein the recess includes an unfilled part, the unfilled part is a part of the recess that is closer to an opening of the recess than the resin layer, and the unfilled part is not filled with the resin layer.

2. The honeycomb sandwich structure according to claim 1, wherein the recess is a first recess, the resin layer is a first resin layer, the water-impermeable film is a first water-impermeable film, the unfilled part is a first unfilled part, and the honeycomb sandwich structure further comprises:
a second resin layer, which is provided for each of the face plates to fill a part of a second recess provided in a mesh of the second carbon fiber fabric; and
a second water-impermeable film, which is provided for each of the face plates to cover an exposed area including surfaces of the second resin layer and the face plates,
wherein the second recess includes a second unfilled part, the second unfilled part is a part of the second recess, the second unfilled part is closer to an opening of the second recess than the second resin layer, and the second unfilled part is not filled with the second resin layer.

3. The honeycomb sandwich structure according to claim 2, wherein when a depth of the first unfilled part is D1 and a film thickness of the first water-impermeable film is t1, D1/t1 is larger than zero and equal to or less than 10.

4. The honeycomb sandwich structure according to claim 3, wherein when a cell width of the honeycomb core is W and a cell height of the honeycomb core is H, H/W is larger than zero and equal to or less than 20.

5. The honeycomb sandwich structure according to claim 4, wherein when an elastic modulus of the first water-impermeable film, a thermal expansion ratio of the first water-impermeable film, and a film thickness of the first water-impermeable film are Em, αm, and tm respectively, (Em·αm·tm) is equal to or less than 2.8 (Pa·m/K).

6. The honeycomb sandwich structure according to claim 3, wherein when an elastic modulus of the first water-impermeable film, a thermal expansion ratio of the first water-impermeable film, and a film thickness of the first water-impermeable film are Em, αm, and tm respectively, (Em·αm·tm) is equal to or less than 2.8 (Pa·m/K).

7. The honeycomb sandwich structure according to claim 2, wherein when a depth of the second unfilled part is D2 and a film thickness of the second water-impermeable film is t2, D2/t2 is larger than zero and equal to or less than 10.

8. The honeycomb sandwich structure according to claim 7, wherein when a cell width of the honeycomb core is W and a cell height of the honeycomb core is H, H/W is larger than zero and equal to or less than 20.

9. The honeycomb sandwich structure according to claim 7, wherein when an elastic modulus of the first water-impermeable film, a thermal expansion ratio of the first water-impermeable film, and a film thickness of the first water-impermeable film are Em, αm, and tm respectively, (Em·αm·tm) is equal to or less than 2.8 (Pa·m/K).

10. The honeycomb sandwich structure according to claim 2, wherein when a cell width of the honeycomb core is W and a cell height of the honeycomb core is H, H/W is larger than zero and equal to or less than 20.

11. The honeycomb sandwich structure according to claim 10, wherein when an elastic modulus of the first water-impermeable film, a thermal expansion ratio of the first water-impermeable film, and a film thickness of the first water-impermeable film are Em, αm, and tm respectively, (Em·αm·tm) is equal to or less than 2.8 (Pa·m/K).

12. The honeycomb sandwich structure according to claim 2, wherein when an elastic modulus of the first water-impermeable film, a thermal expansion ratio of the first water-impermeable film, and a film thickness of the first water-impermeable film are Em, αm, and tm respectively, (Em·αm·tm) is equal to or less than 2.8 (Pa·m/K).

13. The honeycomb sandwich structure according to claim 1, wherein when a depth of the unfilled part is D1 and a film thickness of the water-impermeable film is t1, D1/t1 is larger than zero and equal to or less than 10.

14. The honeycomb sandwich structure according to claim 13, wherein when a cell width of the honeycomb core is W and a cell height of the honeycomb core is H, H/W is larger than zero and equal to or less than 20.

15. The honeycomb sandwich structure according to claim 14, wherein when an elastic modulus of the water-impermeable film, a thermal expansion ratio of the water-impermeable film, and a film thickness of the water-impermeable film are Em, αm, and tm respectively, (Em·αm·tm) is equal to or less than 2.8 (Pa·m/K).

16. The honeycomb sandwich structure according to claim 13, wherein when an elastic modulus of the water-impermeable film, a thermal expansion ratio of the water-impermeable film, and a film thickness of the water-impermeable film are Em, am, and tm respectively, (Em·αm·tm) is equal to or less than 2.8 (Pa·m/K).

17. The honeycomb sandwich structure according to claim 1, wherein when a cell width of the honeycomb core is W and a cell height of the honeycomb core is H, H/W is larger than zero and equal to or less than 20.

18. The honeycomb sandwich structure according to claim 17, wherein when an elastic modulus of the water-impermeable film, a thermal expansion ratio of the water-impermeable film, and a film thickness of the water-impermeable film are Em, am, and tm respectively, (Em·αm·tm) is equal to or less than 2.8 (Pa·m/K).

19. The honeycomb sandwich structure according to claim 1, wherein when an elastic modulus of the water-impermeable film, a thermal expansion ratio of the water-impermeable film, and a film thickness of the water-impermeable film are Em, αm, and tm respectively, (Em·αm·tm) is equal to or less than 2.8 (Pa·m/K).

20. A method for manufacturing the honeycomb sandwich structure according to claim 1, the method comprising:
- filling a part of the recess of the honeycomb core with the resin layer;
- forming the water-impermeable film to cover the exposed area including surfaces of the resin layer and the honeycomb core; and
- adhering the pair of face plates to the honeycomb core by heating under pressure.

* * * * *